No. 898,347. PATENTED SEPT. 8, 1908.
G. W. FIELDHOUSE.
METHOD OF MAKING TWYERS.
APPLICATION FILED NOV. 6, 1907.

4 SHEETS—SHEET 1.

WITNESSES
R A Balderson
W. W. Swartz

INVENTOR
Geo. W. Fieldhouse,
by Bakewell, Byrnes & Parmelee,
his Attys.

No. 898,347. PATENTED SEPT. 8, 1908.
G. W. FIELDHOUSE.
METHOD OF MAKING TWYERS.
APPLICATION FILED NOV. 6, 1907.

4 SHEETS—SHEET 2.

WITNESSES
R A Balderson
W W Swartz

INVENTOR
Geo. W. Fieldhouse,
by Bakewell, Byrnes & Parmelee,
his Attys.

No. 898,347. PATENTED SEPT. 8, 1908.
G. W. FIELDHOUSE.
METHOD OF MAKING TWYERS.
APPLICATION FILED NOV. 6, 1907.
4 SHEETS—SHEET 3.
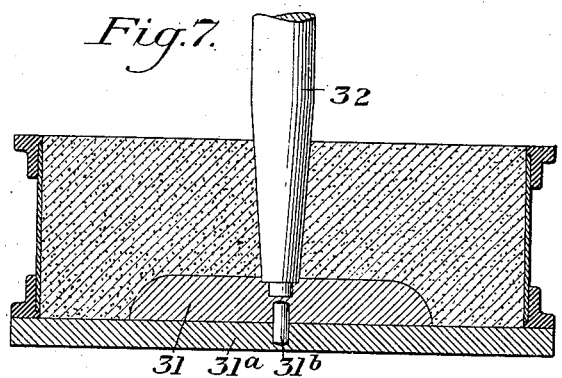
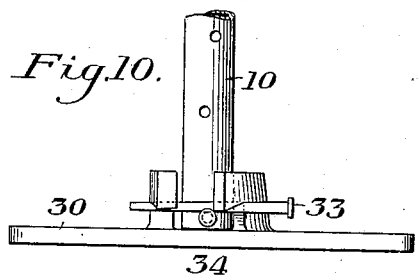
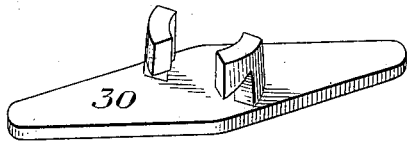
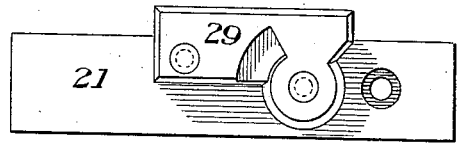
WITNESSES
R. A. Balderson
W. W. Swartz
INVENTOR
Geo. W. Fieldhouse,
by Bakewell, Byrnes & Parmelee,
his Attys.
THE NORRIS PETERS CO., WASHINGTON, D. C.

No. 898,347. PATENTED SEPT. 8, 1908.
G. W. FIELDHOUSE.
METHOD OF MAKING TWYERS.
APPLICATION FILED NOV. 6, 1907.
4 SHEETS—SHEET 4.
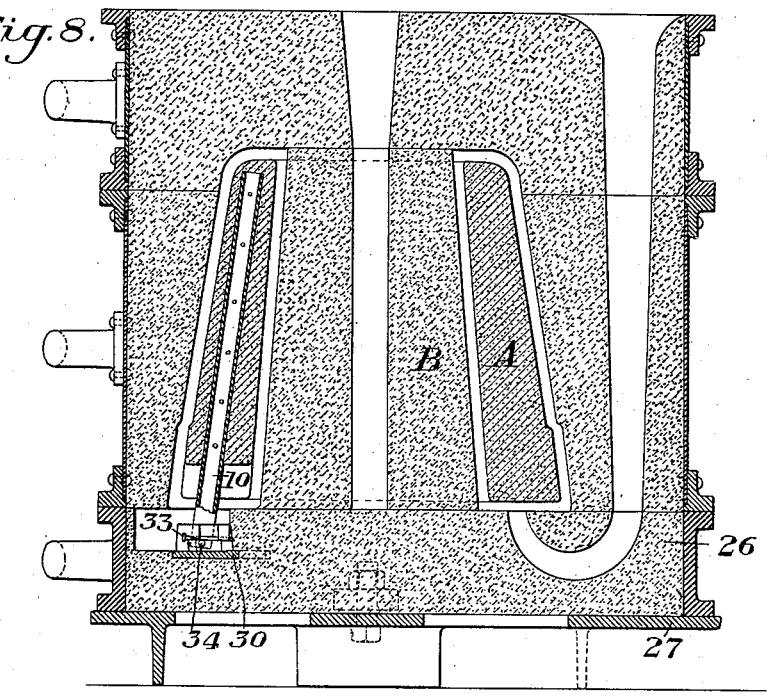
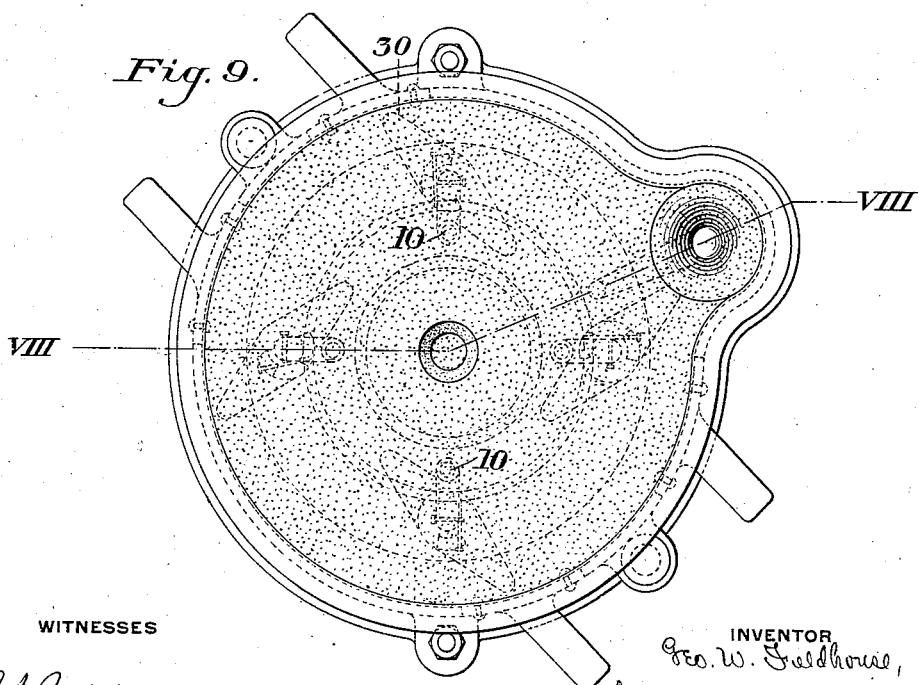

UNITED STATES PATENT OFFICE.

GEORGE W. FIELDHOUSE, OF SWISSVALE, PENNSYLVANIA.

METHOD OF MAKING TWYERS.

No. 898,347.  Specification of Letters Patent.  Patented Sept. 8, 1908.

Application filed November 6, 1907. Serial No. 400,935.

*To all whom it may concern:*

Be it known that I, GEORGE W. FIELDHOUSE, of Swissvale, Allegheny county, Pennsylvania, have invented a new and useful Method of Making Twyers, of which the following is a full, clear, and exact description, reference being had to the accompanying drawings, forming part of this specification, in which—

Figure 1:
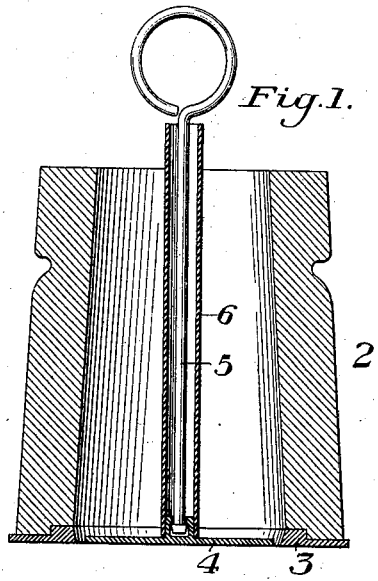
Figure 2:
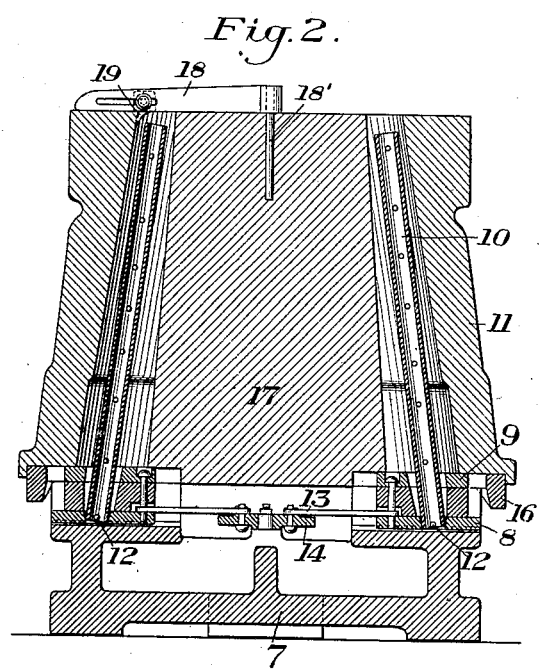
Figure 3:
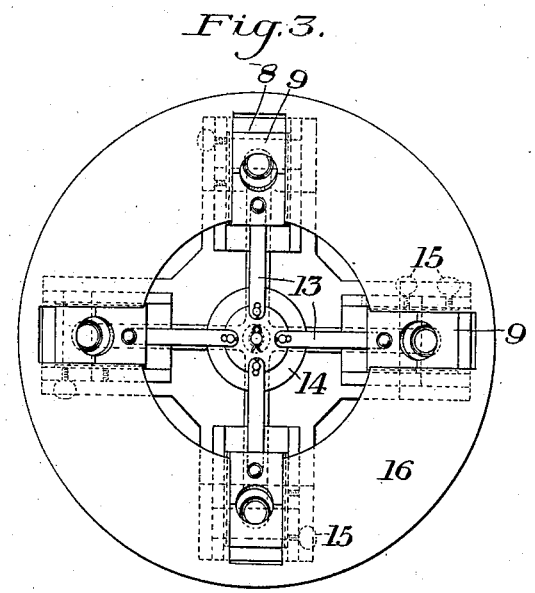
Figure 4:
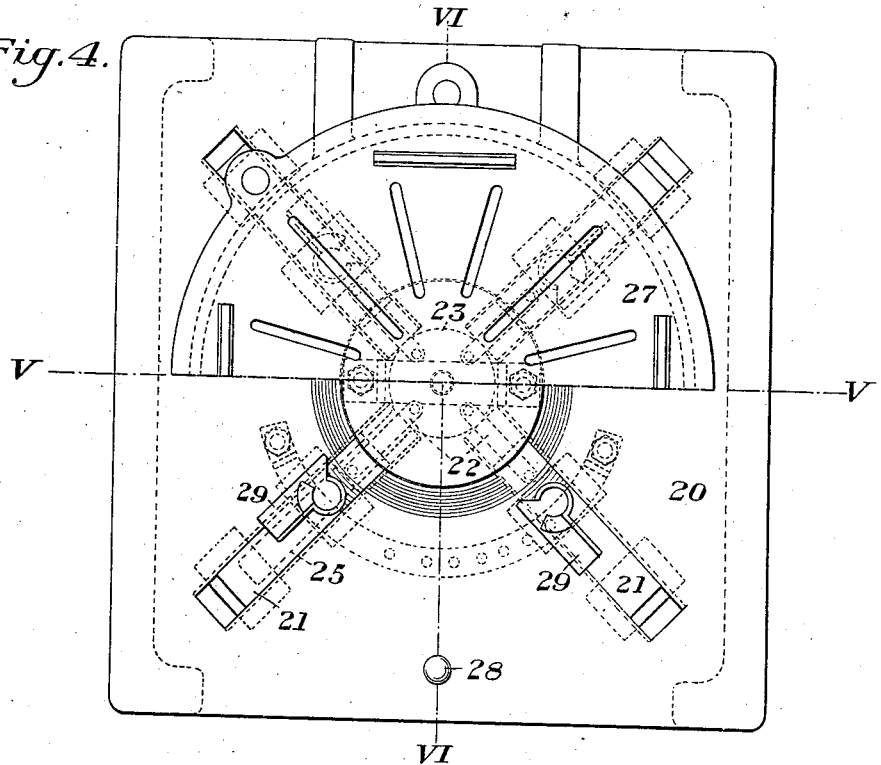
Figure 5:
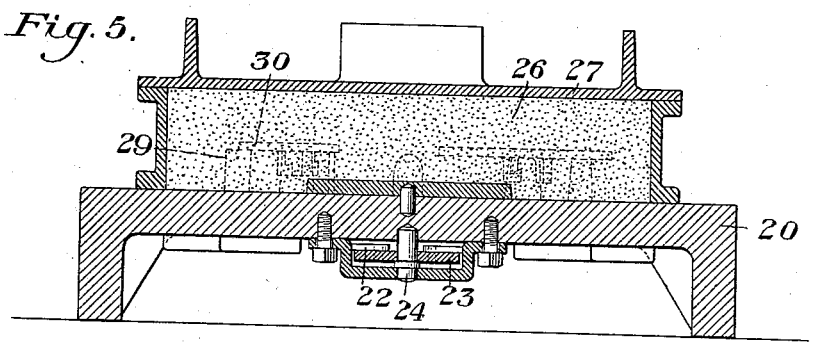
Figure 6:
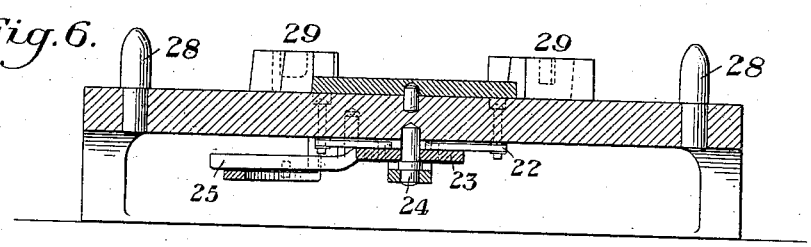

Figure 1 is a vertical section showing the core box in which the central core for the twyer is formed. Fig. 2 is a vertical section showing the core box in which the shell core for the twyer is formed and showing the vent pipes as they are held in position while the sand is being rammed in the core box to form the cores. Fig. 3 is a plan view showing the adjustable mechanism by which the vent pipes are held in position relatively to each other and to the center of the core-forming apparatus. Fig. 4 is a plan view of the stripper, the top half of the view showing the drag and bottom plate in their inverted position upon the stripper, the drag and bottom plate being removed in the lower half of this view. Fig. 5 is a vertical section on the line V—V of Fig. 4 showing the drag which has been rammed and with the inverted bottom plate in place on the drag, the bottom plate together with the drag being in readiness to be removed from the stripper. Fig. 6 is a vertical section of the stripper on the line VI—VI of Fig. 4, the drag and bottom plate being omitted. Fig. 7 is a vertical sectional view of the cope which has been rammed with sand, and showing the pattern for the nose of the twyer in position in the cope. Fig. 8 is a vertical sectional view on the line VIII—VIII of Fig. 9 showing the drag, cheek and cope assembled together to form the flask, and showing the shell core held in position in the flask in accordance with my invention. Fig. 9 is a top plan view of the assembled flask shown in Fig. 8. Fig. 10 is a detail view showing the means employed in securing the vent pipes to the pipe clamps when the parts are assembled in place in the flask. Fig. 11 is a perspective view showing a detail of the pipe clamp used in securing the vent pipes in place in the drag of the mold. Fig. 12 is a detail plan view of the adjustable slides on the stripper on which the pipe clamps are placed while the drag is being rammed with sand.

My invention relates to the molding of twyers, twyer coolers, and similar articles, in which fluid metal is cast around a shell core, and is designed to provide improved means for making such castings, for making and securing the cores in place in the flask, which will reduce the amount of chipping necessary, and to provide a simple and effective apparatus by which the output of cores and of cast twyers is largely increased without increase in the cost of making such twyers.

The invention is further designed to provide an improved apparatus, which is adapted for use in making twyers of various sizes and shapes, and in the use of which the equipment of flasks necessary to make a variety of sizes of such castings is largely reduced.

In the drawings, referring to Fig. 1, 2 represents the core box, in which the central core B is formed. The box 2 is mounted upon a bottom plate 3, the bottom plate and box having coacting shoulders by which the box is centered on this plate. A lifting plate 4 by which the core is handled in removing it from the core box, is placed within the annular opening in the bottom plate 3. The lifting plate 4 is provided with a recessed slot, in which the T-head of the lifting rod 5 is removably secured. Surrounding the lifting rod 5 is a pipe 6, which forms the central vent for the central core.

Referring to Fig. 2, 7 is the base of the core centering machine, on which the shell core A of the apparatus is formed. The base 7 is provided with adjustable slides 8 and 9, by which the vent pipes 10 are secured in place in their proper position in the core box 11. The lower end of each of the pipes 10 is provided with a transverse opening or hole, through which a suitable pin 12 is inserted, this pin engaging with recesses or grooves in the slides 8 and 9 to hold the pipes 10 in position while the core is being rammed. The slides 9 are connected by means of links 13 with a disk 14 to enable the slides 9 to be advanced and retracted simultaneously when the disk 14 is turned by the operator. Each of the slides 8 and 9 is provided with a thumb-screw 15, by which the disks are locked in the desired position.

In constructing shell cores of different diameters, the blocks 8 and 9 are adjusted to the desired diameter, and are secured in their adjusted position by means of the thumb-screws 15. On the top of the base 7 is a core plate 16 having suitable slots through which the slides 8 and 9 project.

The core box 11 is provided with an annular recess on its bottom end, which by engagement with the periphery of the core plate 16 accurately centers the core-box in place on its plate and on the base 7. A removable pattern 17 for the core-box 11 is then placed on the core plate 16. The pipes 10 are successively held at their top ends by the operator, while the bottom portion of the core is being formed by ramming the sand in the core box. After a small portion of the core has been formed the sand will hold the pipes in the proper position while the remainder of the core is being formed. A swinging arm 18 is pivotally secured to the core box 17 by means of a pin 18' and the outer end of the arm 18 is provided with an adjustable filleting tool 19, by which the shell core is rounded off to the desired radius on its outer upper edge.

Referring to Figs. 4, 5 and 6, 20 represents the base of the stripper. This stripper is provided with radial slots, in which slides 21 are secured so as to be adjustable radially. The slides 21 are connected by means of links 22 with a disk 23, which is mounted upon the stub shaft 24 secured to the base 20. The disk 23 is provided with a handle 25, by which the slides 21 are advanced and retracted toward and away from the center of the stripper in adjusting the slides to the desired position for twyers of different sizes. On the slides 21 and projecting above the surface of the base 20 are centering holders 29 on which the pipe clamps 30 are placed. After the slides 21 have been adjusted to the desired position relative to the center of the stripper, a pipe clamp 30 is placed upon each of the centering holders. The drag 26 is then rammed after it has been placed on top of the base 20, and a bottom plate 27 is then placed upon its upper surface. The drag is then in readiness to be inverted and removed from the stripper. Dowel pins 28 are provided on the stripper which engage with suitable ears on the drag so as to center the drag and permit the drag to be rammed with sand with the pipe clamps in the desired position.

Twyers of different sizes will have noses having fillets of different radii. For that reason a removable nose pattern 31 is secured to the bottom plate 31ª by means of the pin 31ᵇ. The cope is then placed in position upon the bottom plate 31ª and is then rammed with sand. A plug 32 placed in position centrally in the cope forms the vent in the cope.

After the cheek has been rammed around the pattern for the twyer in the usual well-known manner, which need not be further described, the drag, the cheek, and the cope, are assembled together as shown in Figs. 8 and 9. In assembling these parts together, the shell core A is first secured in place on the drag 26 by means of the pipes, which are secured to the pipe clamps on the drag by pins 33 and 34, as shown in detail in Fig. 10. The cheek is then placed in position on top of the drag, and the central core B is placed in position in the cheek and on top of the drag. The cope is then placed on top of the cheek, the dowel pins and registering opening in the ears on the cheek, drag, and cope, insuring that the parts come in proper alinement. The apparatus is then in readiness to cast the twyer.

The advantages of my invention result from the manner of securing the vent pipes, while ramming the shell core of the twyer, from the use of the pipe clamps and the pins for securing the pipes to the clamp, and from the use of the improved stripper in which shell cores of various diameters and sizes may be made with the same stripper instead of providing a separate stripper for the shell cores used with each size of twyer.

Instead of securing the vent pipes by means of threaded nuts to a shell plate and center plate, the shell plate and center plate are dispensed with and the core is accurately placed in position in the mold and insures an equal thickness of metal in the shell in the wall of the twyer. The time required in adjusting the cores when the threaded nuts are employed for securing the shell core in the mold is greatly reduced by the use of my improved apparatus, and the use of wires for securing the shell core by means of the vent pipes in position in the assembled mold, is also rendered unnecessary.

Variations in the construction and arrangement of the parts may be made without departing from my invention.

I claim:—

1. In the art of casting hollow articles, the method which consists in forming a core and embedding therein an anchoring device, forming a drag and embedding therein a clamp for the anchoring device, and then assembling the drag and core and securing the anchoring device in the clamp; substantially as described.

2. In the art of casting hollow articles, the method which consists in forming a core and embedding therein a vent pipe, forming a drag and embedding therein a clamp for the vent pipe, and then assembling the drag and core and securing the vent pipe in the pipe clamp to anchor the core to said drag; substantially as described.

3. In the art of casting hollow articles, the method which consists in setting and securing an anchoring device in a core mold, forming the core about said device, leaving a portion of said anchoring device exposed, setting a clamp in the drag mold, and forming the drag about the same, and then assembling the drag and core and securing the anchoring device in the clamp; substantially as described.

4. In the art of casting hollow articles, the method which consists in molding the shell core with vent pipes embedded therein, molding the drag with pipe clamps embedded therein, and then assembling the core and drag and securing the ends of the vent pipes to the clamps; substantially as described.

5. In the art of casting hollow articles, the method which consists in forming a shell-core having vent pipes embedded therein and projecting a predetermined distance from the core, forming the drag of the mold with clamps for the vent pipes embedded therein to a predetermined distance, and then assembling the core and drag, and anchoring the vent pipes to the pipe clamps to anchor the core to said drag, substantially as described.

In testimony whereof, I have hereunto set my hand.

GEO. W. FIELDHOUSE.

Witnesses:
FRANK A. POWER,
G. E. F. GRAY.